(12) United States Patent
Newstadt et al.

(10) Patent No.: US 8,170,978 B1
(45) Date of Patent: May 1, 2012

(54) SYSTEMS AND METHODS FOR RATING ONLINE RELATIONSHIPS

(75) Inventors: Keith Newstadt, Newton, MA (US); Adam Schepis, Milford, MA (US)

(73) Assignee: Symantec Corporation, Mountain View, CA (US)

(\*) Notice: Subject to any disclaimer, the term of this patent is extended or adjusted under 35 U.S.C. 154(b) by 529 days.

(21) Appl. No.: 12/489,579

(22) Filed: Jun. 23, 2009

(51) Int. Cl.
*G06N 5/00* (2006.01)
(52) U.S. Cl. ............................................. 706/54; 706/45
(58) Field of Classification Search .................... 706/54, 706/45
See application file for complete search history.

(56) References Cited

U.S. PATENT DOCUMENTS

2009/0144824 A1\* 6/2009 Rinek .............................. 726/22

\* cited by examiner

*Primary Examiner* — Wilbert L Starks
(74) *Attorney, Agent, or Firm* — Advantedge Law Group

(57) ABSTRACT

A computer-implemented method may include identifying a first communication between a child and a contact and categorizing content of the first communication to create a first categorization. The method may also include identifying a second communication between the child and the contact and categorizing content of the second communication to create a second categorization. The method may further include rating, based at least in part on the first and second categorizations, an online relationship of the child and the contact and providing the rating of the online relationship to a guardian of the contact. Various other methods, systems, and computer-readable media are also disclosed.

20 Claims, 10 Drawing Sheets

Contact Data 600

| | |
|---|---|
| Name | John R. Smith |
| Home Phone | |
| Work Phone | 1-811-413-4679 |
| Cell Phone | 1-912-376-9861 |
| Home Address | |
| Work Address | 56789 Park Ave, NY |
| Email Address | jsmith@gmail.com |
| IM Address | |
| Website | |
| Online Alias | John R. Smith |

Contact Data 610

| | |
|---|---|
| Name | |
| Home Phone | 1-123-456-1291 |
| Work Phone | |
| Cell Phone | 1-912-376-9861 |
| Home Address | 1234 Anywhere St, NV |
| Work Address | |
| Email Address | |
| IM Address | johnny boy |
| Website | www.smitty.com |
| Online Alias | smitty |

Contact Record 620

| | |
|---|---|
| Name | John R. Smith |
| Home Phone | 1-123-456-1291 |
| Work Phone | 1-811-413-4679 |
| Cell Phone | 1-912-376-9861 |
| Home Address | 1234 Anywhere St, NV |
| Work Address | 56789 Park Ave, NY |
| Website | www.smitty.com |
| Online Alias | AIM: johnny boy<br>GMAIL: jsmith<br>MYSPACE: smitty<br>LINKEDIN: John R. Smith |

*FIG. 6*

SYSTEMS AND METHODS FOR RATING ONLINE RELATIONSHIPS

BACKGROUND

Parental control applications may provide a parent with the ability to monitor and block communications between their child and online contacts with whom their child communicates. However, a child's online community may be enormous, including hundreds of friends and acquaintances from both the real world (e.g., school) and online (e.g., gaming) activities. While conventional solutions may help parents find individual instances of inappropriate content in a child's communications, it may be very difficult for a parent to use such solutions to make policy decisions for a large list of online friends.

Conventional parental control solutions are inadequate for dealing with the ever-growing online landscape in which children are involved. Such solutions may implement simple text searches to find suspect keywords and may generate a high number of false positives. Traditional solutions may also find individual instances of suspect keywords, but may only focus on obscenities and other easily detectable violations of parental-control policies. Furthermore, traditional solutions may not help parents make informed and efficient decisions regarding whether they should allow their children to communicate with particular online contacts or whether they should more closely monitor conversations between their children and particular online contacts.

SUMMARY

As will be described in greater detail below, the instant disclosure generally relates to systems and methods for rating online relationships. A computer-implemented method for rating an online relationship may include identifying a first communication between a child and a contact, categorizing content of the first communication to create a first categorization, identifying a second communication between the child and the contact, and categorizing content of the second communication to create a second categorization. The method may also include rating, based at least in part on the first and second categorizations, the online relationship of the child and the contact. The method may include providing the rating of the online relationship to a guardian of the contact.

In some embodiments, categorizing content of the first communication may include assigning a first weight to the first categorization. The first weight may indicate a probability of the first categorization being an accurate categorization of the first communication. Categorizing content of the second communication may include assigning a second weight to the second categorization. The second weight may indicate a probability of the second categorization being an accurate categorization of the second communication. The rating of the online relationship may be created based at least in part on the first and second weights.

In some embodiments, the first communication may be made via a first communication mechanism. In such embodiments, identifying the first communication between the child and the contact may include identifying a first alias associated with the first communication and determining that the first alias is an alias of the contact. Similarly, the second communication may be made via a second communication mechanism. Identifying the second communication between the child and the contact may include identifying a second alias associated with the second communication mechanism and determining that the second alias is an alias of the contact.

In some embodiments, the method may further include categorizing content of subsequent communications between the child and the contact and updating, based at least in part on categorizations of the content of the subsequent communications, the rating of the online relationship. According to various embodiments, the first categorization may identify a sender of the first communication and the second categorization may identify a sender of the second communication. In various embodiments, the rating of the online relationship may indicate a pattern of inappropriate content being exchanged between the child and the contact.

In some embodiments, categorizing the content of the first communication may include identifying a uniform resource locator in the content of the first communication and categorizing content referenced by the uniform resource locator. According to various embodiments, the first communication may include a file, and categorizing the content of the first communication may include categorizing content of the file. According to certain embodiments, rating the online relationship of the child and the contact may include rating online relationships between the child and a plurality of contacts. In some embodiments, providing the rating of the online relationship may include providing a plurality of ratings of the online relationship. In such embodiments, each rating in the plurality of ratings may be associated with a different type of content.

According to certain embodiments, a system for rating an online relationship may include at least one processor. The system may also include a monitoring module programmed to direct the processor to identify a first communication between the child and the contact and a second communication between the child and the contact. The system may also include a categorization module programmed to direct the processor to categorize content of the first communication to create a first categorization and categorize content of the second communication to create a second categorization. The system may include a rating module programmed to direct the processor to rate, based at least in part on the first and second categorizations, the online relationship of the child and the contact. The system may include an interface module programmed to direct the processor to provide the rating of the online relationship to a guardian of the contact.

In some embodiments, the categorization module may be further programmed to direct the processor to assign a first weight to the first categorization. The first weight may indicate a probability of the first categorization being an accurate categorization of the first communication. The categorization module may also be further programmed to direct the processor to assign a second weight to the second categorization. The second weight may indicate a probability of the second categorization being an accurate categorization of the second communication. In such embodiments, the rating of the online relationship may be created based at least in part on the first and second weights.

According to various embodiments, the first communication may be made via a first communication mechanism and the second communication may be made via a second communication mechanism. In such embodiments, the monitoring module may be programmed to direct the processor to identify a first alias associated with the first communication, determine that the first alias is an alias of the contact, identify a second alias associated with the second communication mechanism, and determine that the second alias is an alias of the contact.

In some embodiments, the categorization module may be programmed to direct the processor to categorize content of subsequent communications between the child and the contact. In such embodiments, the rating module may be programmed to direct the processor to update, based at least in part on categorizations of the content of the subsequent communications, the rating of the online relationship.

In some embodiments, the rating of the online relationship may indicate a pattern of inappropriate content being exchanged between the contact and the child. According to certain embodiments, the categorization module may be programmed to direct the processor to identify a uniform resource locator in the content of the first communication and categorize content referenced by the uniform resource locator. In some embodiments, the first communication may include a file, and the categorization module may be programmed to categorize content of the file.

According to certain embodiments, a computer-readable-storage medium may include one or more computer-executable instructions that, when executed by a computing device, may cause the computing device to: (1) identify a first communication between the child and the contact, (2) categorize content of the first communication to create a first categorization, (3) identify a second communication between the child and the contact, (4) categorize content of the second communication to create a second categorization, (5) rate, based at least in part on the first and second categorizations, the online relationship of the child and the contact, and (6) provide the rating of the online relationship to a guardian of the contact.

In some embodiments, the one or more computer-executable instructions may be programmed to cause the computing device to assign a first weight to the first categorization. The first weight may indicate a probability of the first categorization being an accurate categorization of the first communication. The one or more computer-executable instructions may also be programmed to cause the computing device to assign a second weight to the second categorization. The second weight may indicate a probability of the second categorization being an accurate categorization of the second communication. In such embodiments, the rating of the online relationship may be created based at least in part on the first and second weights.

In some embodiments, the first communication may be made via a first communication mechanism and the second communication may be made via a second communication mechanism. In such embodiments, the one or more computer-executable instructions may be programmed to cause the computing device to identify a first alias associated with the first communication, determine that the first alias is an alias of the contact, identify a second alias associated with the second communication mechanism, and determine that the second alias is an alias of the contact.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 6 is a block diagram of an exemplary contact record.

Figure 1:
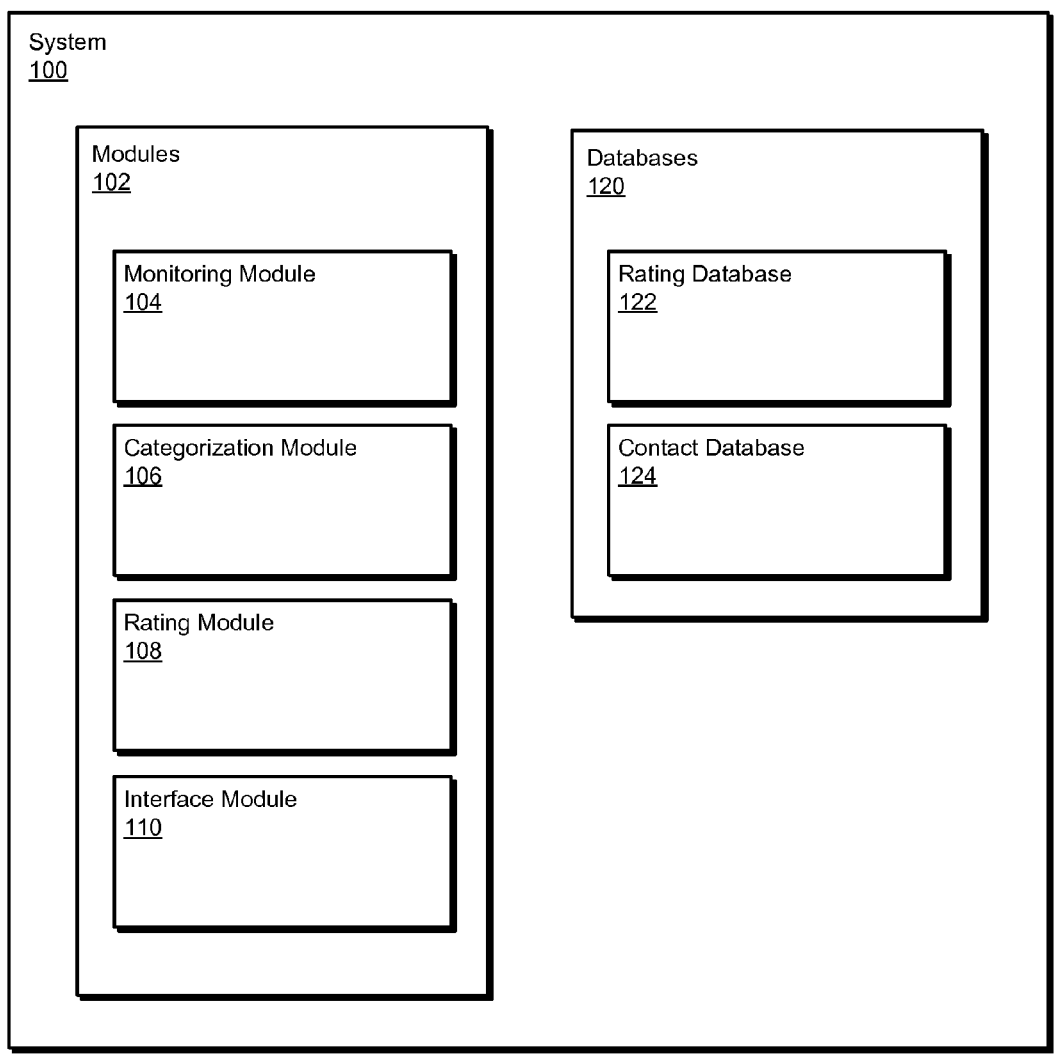
FIG. 1 is a block diagram of an exemplary system for rating online relationships.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for rating online relationships. For example, a rating system may identify multiple communications between a child and a contact. The rating system may then categorize content of the communications and use the categorizations to rate the online relationship of the child and the contact. Thus, embodiments of the instant disclosure may create ratings of online relationships by evaluating content over time and/or across multiple conversations with an online contact.

Embodiments of the instant disclosure provide various advantages over traditional technologies. Embodiments of the instant disclosure may enable parents to see a more complete view of a child's online world rather than just seeing a raw history log. For example, in some embodiments a parent may be able to scan their child's list of online friends and determine who talks to their child about sex, drugs, eating disorders, sports, shopping, and/or any other topics of interest to a parent. Thus, a parent may be able to make more informed decisions regarding how to control their child's online communications.

Figure 2:
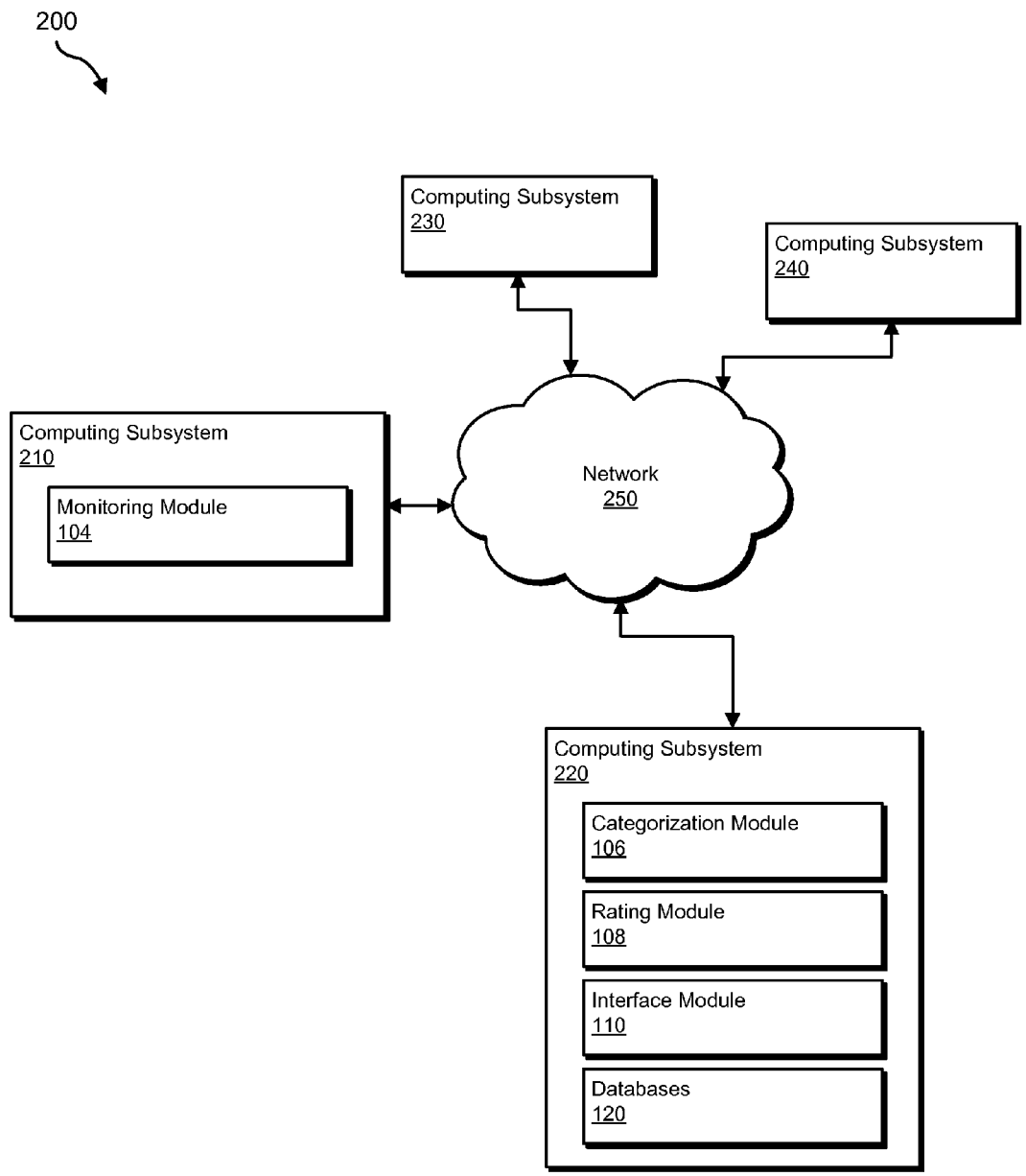
FIG. 2 is a block diagram of another exemplary system for rating online relationships.
Figure 4:
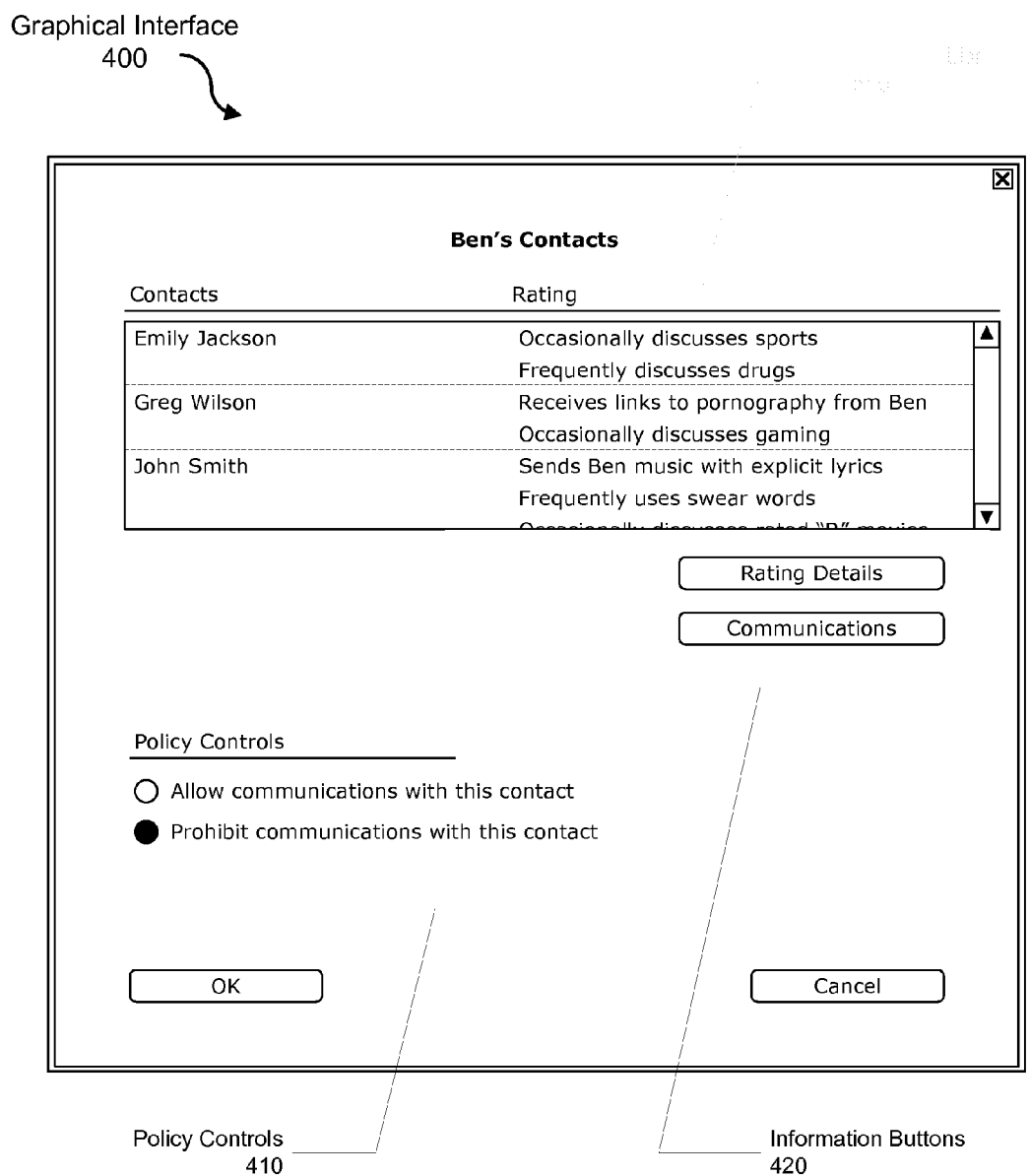
FIG. 4 is a block diagram of an exemplary graphical interface for displaying ratings.
Figure 5:
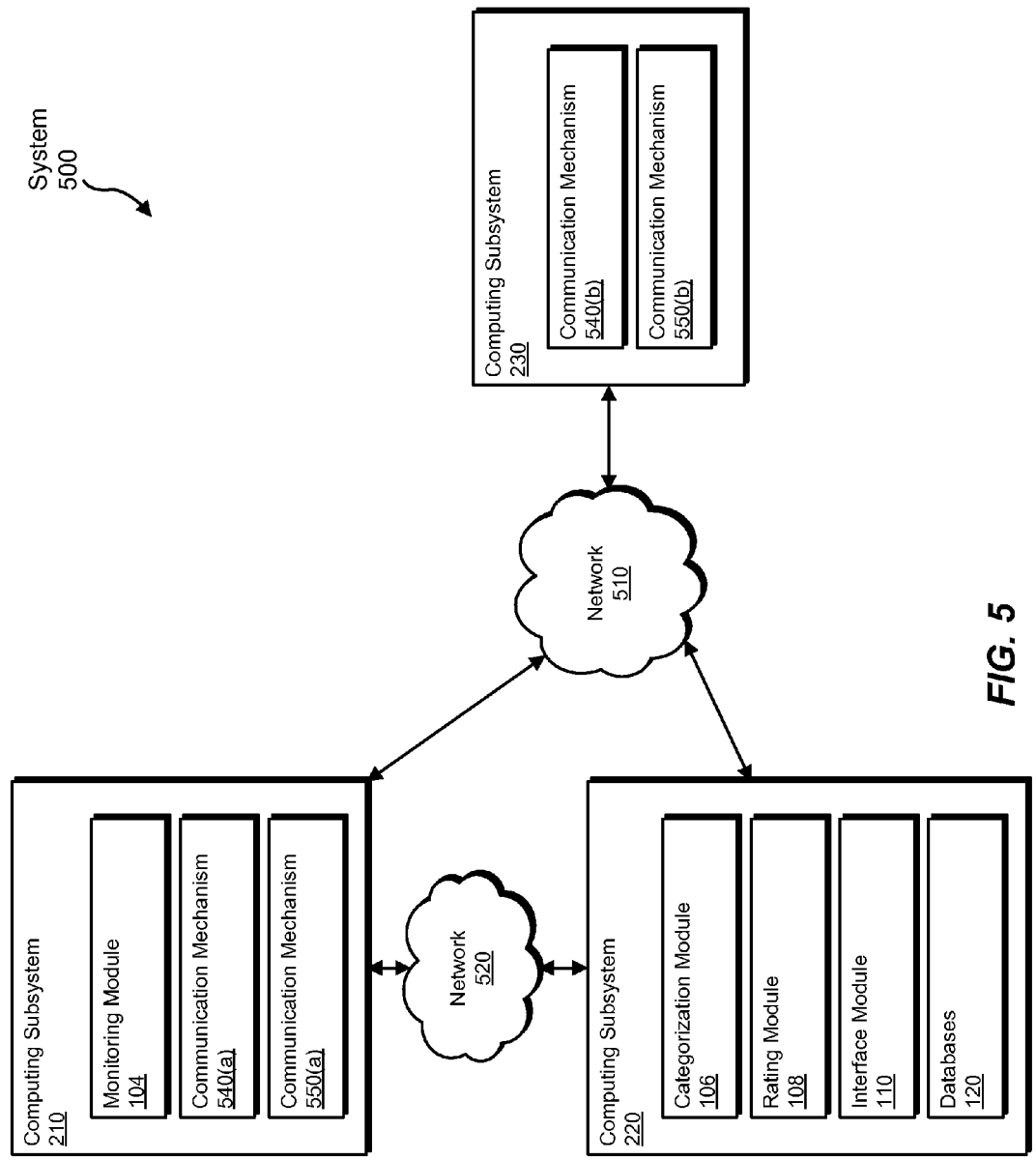
FIG. 5 is a block diagram of an exemplary system for rating online relationships.
Figure 7:
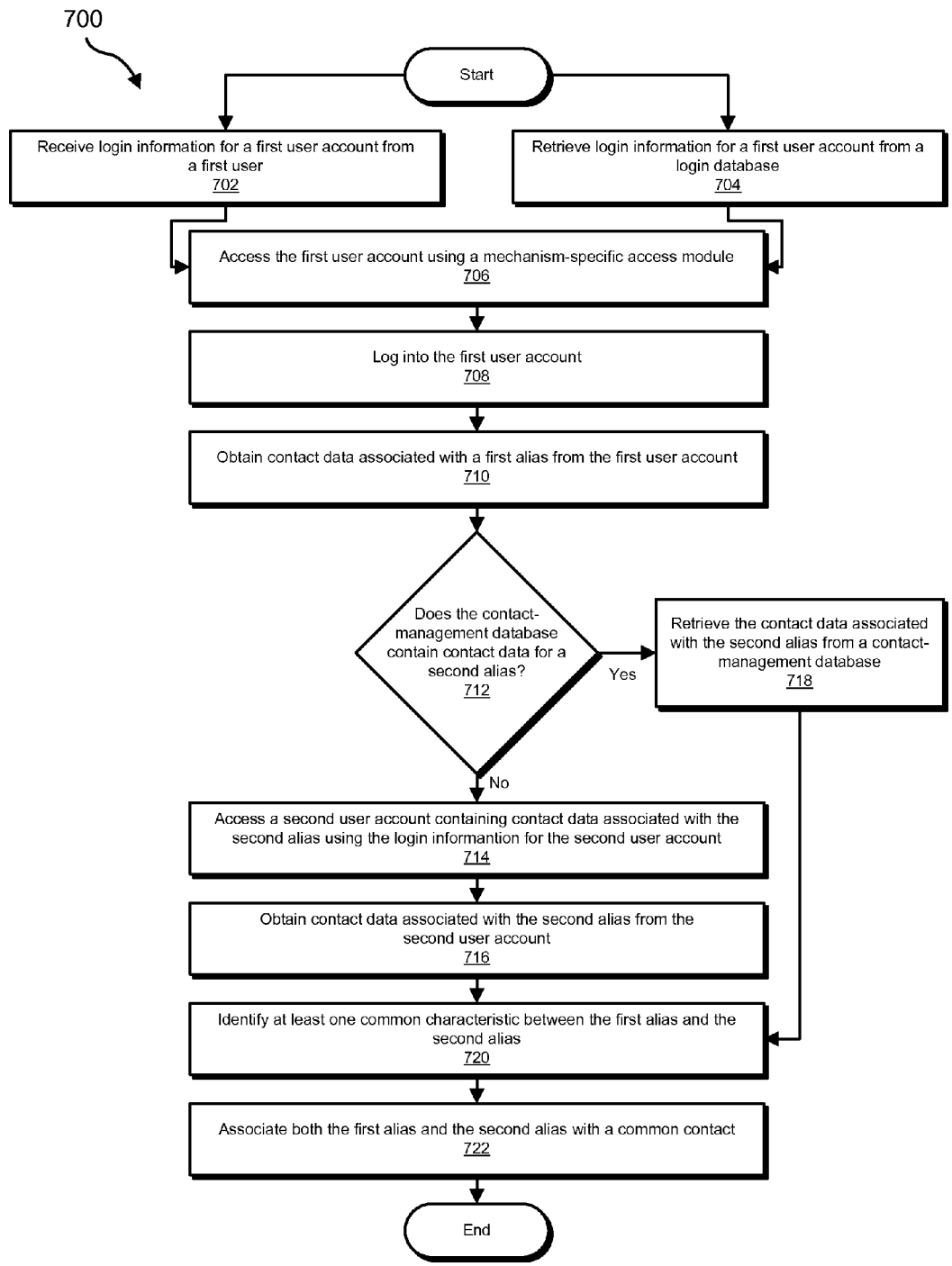
FIG. 7 is a flow diagram of an exemplary method for correlating aliases with real-world identities.
Figure 8:
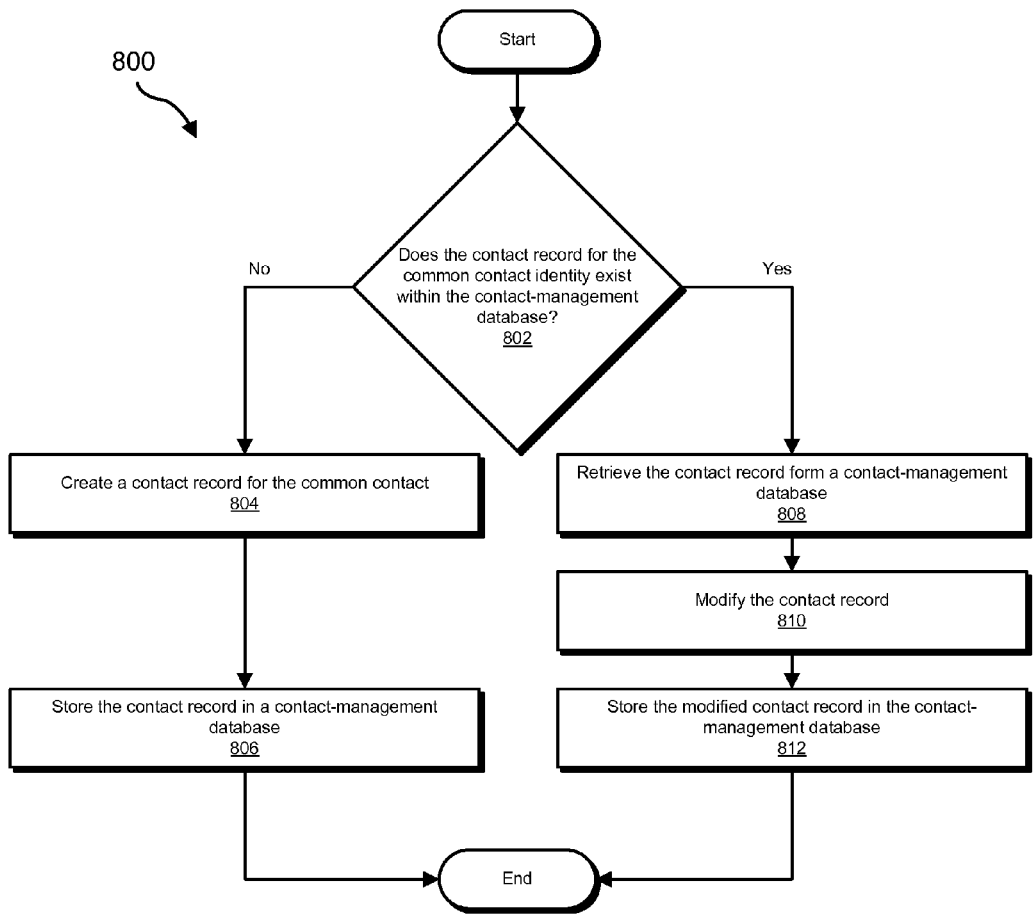
FIG. 8 is a flow diagram of an exemplary method for associating aliases with common contacts or identities.

The following will provide, with reference to FIGS. 1, 2, and 5, detailed descriptions of exemplary systems for rating online relationships. Detailed descriptions of corresponding computer-implemented methods will also be provided in connection with FIG. 3. FIG. 4 shows a graphical interface for displaying ratings of online relationships, and FIGS. 6-8 show how aliases may be associated with real-world identities. In addition, detailed descriptions of an exemplary computing system and network architecture capable of implementing one or more of the embodiments described herein will be provided in connection with FIGS. 9 and 10, respectively.

FIG. 1 is a block diagram of an exemplary system 100 for rating online relationships. As illustrated in this figure, exemplary system 100 may include one or more modules 102 for performing one or more tasks. For example, and as will be explained in greater detail below, modules 102 may include a monitoring module 104, a categorization module 106, a rating module 108, and an interface module 110. Monitoring module 104 may be programmed to identify first and second communications between a child and a contact. Categorization module 106 may be programmed to categorize content of the first and second communications to create first and second categorizations. Rating module 108 may be programmed to direct the processor to rate, based at least in part on the first and second categorizations, the online relationship of the child and the contact. Interface module 110 may be programmed to provide the rating of the online relationship to a guardian of the contact. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystem 210), computing system 910 in FIG. 9, and/or portions of exemplary network architecture 1000 in FIG. 10. One or more of modules 102 in FIG. 1 may also represent all or portions of one or more special-purpose computers configured to perform one or more tasks.

As illustrated in FIG. 1, exemplary system 100 may also include one or more databases 120. Databases 120 may represent portions of a single database or computing device or a plurality of databases or computing devices. In one embodiment, exemplary system 100 may include a rating database 122 for storing ratings of online relationships. Exemplary system 100 may also include a contact database 124 for storing contacts and/or aliases of contacts.

Databases 120 in FIG. 1 may represent a portion of one or more computing devices. For example, databases 120 may represent a portion of server 206 in FIG. 2, computing system 910 in FIG. 9, and/or portions of exemplary network architecture 1000 in FIG. 10. Alternatively, databases 120 in FIG. 1 may represent one or more physically separate devices capable of being accessed by a computing device, such as network 250 in FIG. 2 computing system 910 in FIG. 9 and/or portions of exemplary network architecture 1000 in FIG. 10.

FIG. 2 is a block diagram of an exemplary system 200 for rating online relationships. As illustrated in this figure, exemplary system 200 may include computing subsystems 210, 220, 230, and 240 that communicate over a network 250. In some embodiments, computing subsystem 210 may be a child's computing system, computing subsystem 220 may be a parent's computing system, and computing subsystems 230 and 240 may be contacts' computing systems. Computing subsystem 210 may include monitoring module 104, and computing subsystem 220 may include categorization module 106, rating module 108, interface module 110, and databases 120. In other embodiments, computing subsystem 210, in addition to or instead of computing subsystem 220, may include categorization module 106, rating module 108, interface module 110, and databases 120.

Computing subsystems 210-240 generally represent any type or form of computing device capable of reading computer-executable instructions. Examples of computing subsystems 210-240 include, without limitation, laptops, desktops, servers, cellular phones, personal digital assistants (PDAs), multimedia players, embedded systems, combinations of one or more of the same, exemplary computing system 910 in FIG. 9, or any other suitable computing device.

Network 250 generally represents any medium or architecture capable of facilitating communication or data transfer. Examples of network 250 include, without limitation, an intranet, a wide area network (WAN), a local area network (LAN), a personal area network (PAN), the Internet, power line communications (PLC), a cellular network (e.g., a GSM Network), exemplary network architecture 1000 in FIG. 10, or the like. Network 250 may facilitate communication or data transfer using wireless or wired connections.

Figure 3:
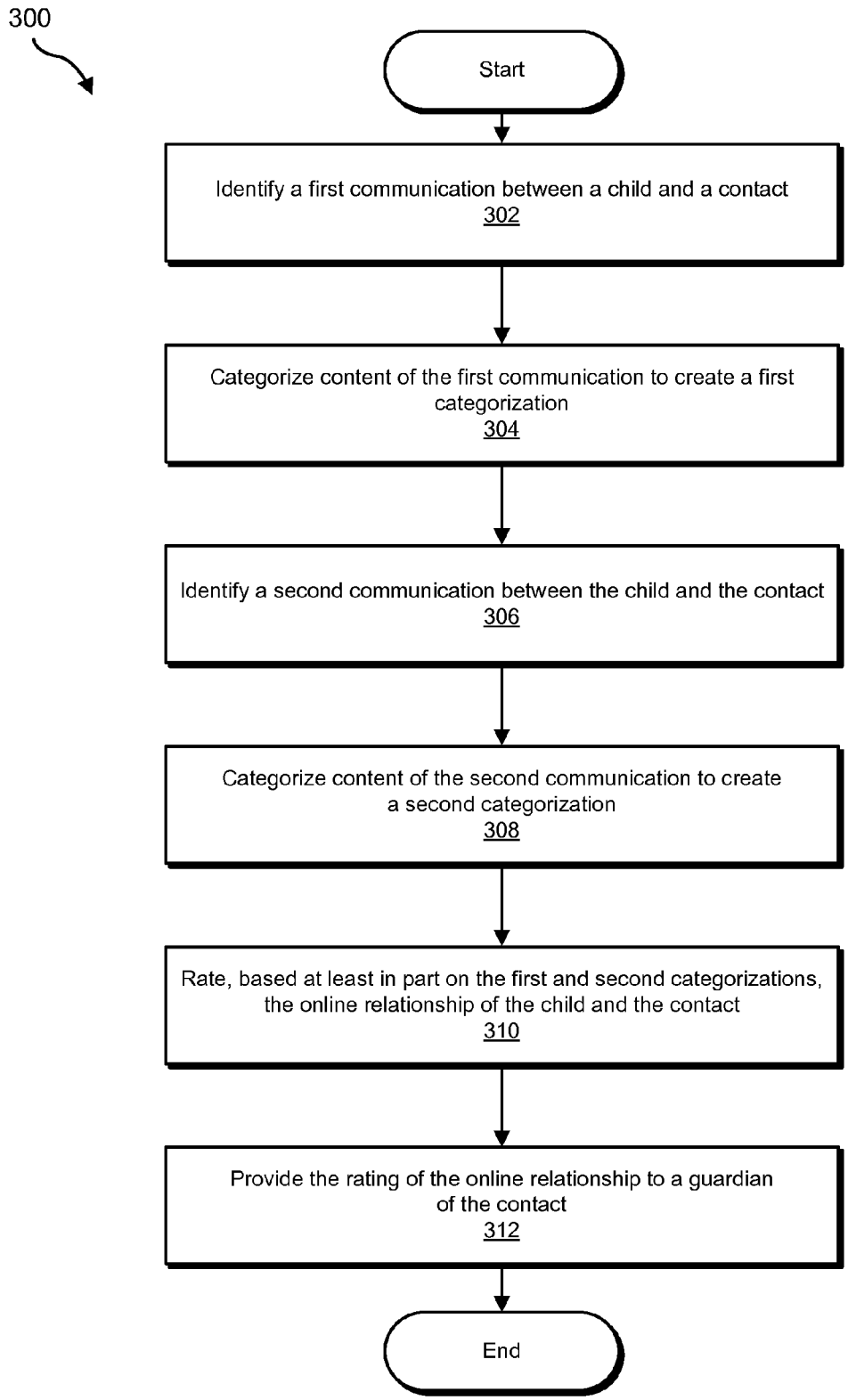
FIG. 3 is a flow diagram of an exemplary method for rating online relationships.

FIG. 3 is a flow diagram of an exemplary computer-implemented method 300 for rating online relationships. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2. For example, at step 302 monitoring module 112 may, as part of computing subsystem 210, identify a first communication between a child and a contact. As used herein, the term "contact" generally refers to a friend, an acquaintance, a stranger, or any other individual with whom a child may communicate.

As used herein, the term "communication" generally refers to any electronic communication between a child and a contact. For example, a communication may include a text message, an email message, a communication made over a social networking website, an instant message, a voice message, and/or any other type or form of digital communication.

Monitoring module 104 may monitor and identify communications made through one or more communication mechanisms. In some embodiments, monitoring module 104 may include a pluggable engine that utilizes a network driver and/or any number of monitoring plug-ins to monitor communications. The network driver may monitor incoming and outgoing communications and may transfer one or more communications to one or more monitoring plug-ins. In some embodiments, monitoring module 104 may include a monitoring plug-in for each communication mechanism to be monitored. For example, monitoring module 104 may include a plug-in associated with an instant messaging communication mechanism and a plug-in associated with an email communication mechanism.

A monitoring plug-in may be programmed to interpret specific types of communications. A monitoring plug-in may also be programmed to determine whether a communication should be blocked, allowed, or otherwise controlled. In some embodiments, a monitoring plug-in may also be responsible for performing packet altering when a conversation is blocked. According to various embodiments, a new monitoring plug-in may be installed to monitoring module 104 to monitor a new communication mechanism. A monitoring plug-in may also be removed from monitoring module 104 when a communication mechanism associated with the plug-in is no longer being used. A security software vendor may package monitoring plug-ins with security software and/or may provide downloadable plug-ins.

As described above, monitoring module 104 may monitor and/or control network traffic with a network driver and one or more monitoring plug-ins. Monitoring module 104 may additionally or alternatively include any other suitable monitoring and/or control mechanism for monitoring and/or controlling network traffic.

Returning to FIG. 3, after monitoring module 104 identifies the first communication, at step 304 categorization module 106 may categorize content of the first communication to create a first categorization. Categorization module 106 may categorize content by first identifying content in the first communication and then analyzing the content. Categorization module 106 may identify content in the communication by scanning the communication through text and/or natural language searches, analyzing images, videos, files, or other content embedded in or attached to the communication, and/or evaluating the communication in any other manner.

Categorization module 106 may analyze and/or categorize any content in a communication. To categorize content, categorization module 106 may select one or more categories associated with the content. For example, if categorization module 106 identifies the word "bong" in a communication, categorization module may categorize the word "bong" in a "drug-related language" category. In some embodiments, categorization module 106 may query a remote or local database of categories to determine a category for a word or for other content. Categories may be predefined by a parental-control software vendor, by a parent, and/or by any other entity. Additionally or alternatively, categories may be created on-the-fly as categorization module 106 identifies and analyzes content.

In some embodiments, categorization module 106 may categorize content of a communication in more than one category. For example, categorization module 106 may identify an mp3 file attached to a communication module. Categorization module 106 may query a music rating database to determine that the mp3 file contains lyrics about sex and violence. Categorization module 106 may then categorize the mp3 file in both sex- and violence-related categories.

Categorization module 106 may identify various different pieces of content in a single communication. For example, categorization module 106 may identify gaming-related language and violence-related language in a single text message, and categorization module 106 may categorize these instances of content in different categories. Categorization module 106 may also identify various different types of content in a communication. For example, categorization module 106 may identify an email that includes text about eating disorders, a link to a website about eating disorders, and an attachment of a pornographic picture. Categorization module 106 may identify each of these content instances and categorize them individually or collectively in one or more categories.

According to certain embodiments, categorization module 106 may assign a weight to the categorization of the content in the first communication. The weight may indicate a probability of the categorization being an accurate categorization of the content. For example, if the content includes the word "coke," categorization module 106 may categorize the content as drug-related but may assign the categorization a weight of 0.5 because the word "coke" may refer to soft drinks instead of drugs. In contrast, if the content includes a link to a drug-related website, categorization module 106 may categorize the content as drug-related and may assign the categorization a weight of 0.9.

Categorization module 106 may create categorizations in a variety of manners. For example, categorization module 106 may associate content with a category in a database, such as rating database 122, that tracks ratings of contacts. In some embodiments, the categorization may be used to establish or update a rating of an online relationship and may then be discarded or saved.

To establish a rating for an online relationship, multiple communications may be identified and categorized. Thus, at step 306 monitoring module 104 may identify a second communication between the child and the contact, and at step 308, categorization module 106 may categorize content of the second communication to create a second categorization. The second communication may be identified and categorized using any of the mechanisms described in steps 302 and 304.

In some embodiments, the second communication may be made during the same conversation as the first communication. For example, the first and second communications may both be communications made during an instant messaging conversation or as part of an email conversation. Alternatively, the first and second communication may be made using different communication mechanisms and/or during different conversations. For example, the first communication may be made over a social networking website and the second communication may be made using a text message.

While FIG. 3 shows an example of identifying and categorizing two communications, any number of communications may be identified and categorized. For example, each time a communication is detected between the child and the contact, the communication may be analyzed and content of the communication may be categorized. Detecting and categorizing multiple communications over a period of time and/or continuously may facilitate comprehensive and accurate ratings of online relationships.

At step 310, rating module 108 may rate, based at least in part on categorizations of content of the first and second communications, the online relationship between the child and the contact. As used herein, the phrase "online relationship" may refer to the substance of communications between a child and a contact. In some embodiments, an online relationship may encompass communications sent to and received from a contact. In other embodiments, an online relationship may only encompass communications received from the contact. In such embodiments, a rating of an online relationship may be a rating of the contact. Alternatively, an online relationship may only encompass communications sent to the contact. In some embodiments, rating module 108 may track whether the child or the contact is responsible for sending a particular piece of content. Thus, a parent may be informed about whether their child or the contact is responsible for sending objectionable content and/or initiating an objectionable discussion.

Rating module 108 may rate the online relationship between the child and the contact by analyzing, aggregating, or otherwise using the categorizations of the first and second communications (and/or any other communications). In some embodiments, rating module 108 may use the first and second communications to determine a frequency of a particular type of communication. For example, if 10 communications are exchanged between the friend and the contact and two of those communications discuss sex, rating module 108 may rate the online relationships as a relationship where sex is occasionally discussed. In another example, if 15 communications are exchange between the child and the contact, and each of the 15 communications discusses gaming, rating module 108 may rate the online relationship as a relationship centered around gaming.

In addition to or instead of determining the frequency of certain types of communications, rating module 108 may analyze communications between the child and the contact to determine a probability that the child and the contact discuss a particular subject. For example, if the term "skinny" appears in several communications, the communications may be categorized as communications discussing an eating disorder, but each communication may only be assigned a weight of 0.2. At this point, the relationship between the child and the contact may be rated as "possibly discussing eating disorders." If a subsequent communication includes the term "anorexia," the communication may be categorized as a communication discussing an eating disorder and may be assigned a weight of 1.0. In some embodiments, rating module 108 may average the weights of each of these communications and may rate the relationship as "probably discussing eating disorders." Alternatively, rating module 108 may use the categorization with the highest weight (in this example, 1.0) and may rate the relationship as "discussing eating disorders."

In some embodiments, rating module 108 may rate an online relationship based on how many instances of a particular type of content are detected over time. In such embodiments, rating module 108 may change the rating of the online relationship when the number of instances reaches a predetermined threshold. For example, the threshold for a rating of "occasionally discusses sex" may be three categorizations of sexual content and the threshold for a rating of "often discusses sex" may be ten categorizations of sexual content. Thus, as categorizations in a particular category accumulate over time for a relationship, rating module 108 may update the rating of the relationship.

Rating module 108 may use any combination of the foregoing approaches to use categorizations to rate an online relationship. Rating module 108 may also use any other suitable algorithm and/or heuristic to use categorizations to rate online relationships.

After the online relationship has been rated, at step 312 interface module 110 may provide the rating to a guardian of the contact. The rating may be provided to a guardian of the contact in a variety of manners. For example, as shown in FIG. 4, the ratings of online relationships with contacts may be provided through a graphical user interface. Additionally or alternatively, the ratings of online relationships may be emailed to a guardian of the child or provided to a guardian of the child in any other suitable manner.

FIG. 4 shows a graphical interface 400. Graphical interface 400 may show one or more ratings associated with one or more contacts. For example, a child named Ben may have several contacts, including Emily Jackson, Greg Wilson, and John Smith. Graphical interface 400 may display ratings associated with each of these contacts. For example, in Ben's communications with Emily, they occasionally discuss sports and frequently discuss drugs. Graphical interface 400 also shows that Greg receives links to pornography from Ben and that Ben and Greg occasionally discuss gaming. Graphical interface 400 also shows that John sends Ben music with explicit lyrics and their conversations frequently include swear words.

As previously noted, ratings of relationships may be based on categorizations of communications sent to and received from a contact. In such embodiments, a parent may still be notified of a potential issue in situations where the contact does not send objectionable communications to the child but the child sends objectionable communications to a contact. In other embodiments, ratings of relationships may be based only on categorizations of communications received from the contact. Such ratings may be referred to as ratings of the contact because the content being scrutinized is only from the contact. Other ratings may be based only on categorizations sent from the child to the contact.

Ratings of online relationships may enable parents to make informed decisions about controlling a child's communications. For example, ratings on online relationships may indicate patterns of inappropriate content being exchanged between a child and a contact. Thus, in making a decision about how to control a child's communications, a parent may more efficiently and accurately determine which contacts to block and which communications may need closer monitoring. In some embodiments, a parent may be able to define categories for content that is used in rating online relationships, which may enable a parent to gather various types of information about a child's online relationships.

Graphical interface 400 may include information buttons 420 that allow a parent to view additional details about how the rating was calculated and/or view specific communications that led to the rating. Graphical interface 400 may also include policy controls 410, which a parent may use to allow or prohibit communications with a contact. In other embodiments, parents may also be able to apply a variety of other controls to a child's communications. A parent may use a graphical user interface, such as graphical interface 400, to associate a communication-control policy with a contact.

A communication-control policy may include any policy for controlling communications. For example, a communication-control policy may include a policy indicating that communications should be allowed, blocked, partially blocked, and/or controlled in any other way. A communication-control policy may additionally or alternatively indicate that a warning or other notification should be displayed to a user when the user attempts to communicate with a particular contact. A communication-control policy may indicate that particular communications, communication sessions, and/or other communication data should be controlled. By associating a communication-control policy with a contact, communications with a contact may be controlled regardless of the communication mechanism used to communicate with the contact.

Communication-control policies may be established by parents, guardians, teachers, and/or others interested in protecting children from inappropriate communications. Thus, the term "parent" is used herein to refer to any individual who establishes, maintains, or otherwise administers control policies that apply to communications involving a child.

Communications between the child and the contact may be controlled in a variety of manners. For example, communications may be controlled using any method or process described in U.S. patent application Ser. No. 12/411,963, filed on 26 Mar. 2009, and titled "Methods and Systems for Controlling Communications," the disclosure of which is incorporated, in its entirety, by this reference.

As previously noted, in some embodiments, communications from different communication mechanisms may be detected and analyzed. FIG. 5 illustrates an exemplary system 500 with multiple communication mechanisms on a child's computing system and a contact's computing system. System 500 may include computing subsystem 210, computing subsystem 220, computing subsystem 230, a network 510, and a network 520. Computing subsystem 210 may include monitoring module 104, a communication mechanism 540(a), and a communication mechanism 550(a). Computing subsystem 220 may include categorization module 106, rating module 108, interface module 110, and databases 120. Computing subsystem 230 may include communication mechanism 540(b) and communication mechanism 550(b).

As used herein the phrase "communication mechanism" may refer to any protocol, medium, channel, or service that may allow one person to communicate with another. For example, a communication mechanism may include an e-mail service, an instant-messaging service, a voice chat service, a social-networking website, and/or any other service for providing communications. Communication mechanisms may also include any communication protocol, such as Simple Mail Transfer Protocol ("SMTP"), a voice messaging protocol such as Voice Over Internet Protocol ("VOIP"), a text-messaging protocol such as a Short Message Service ("SMS") protocol, a HyperText Transfer Protocol ("HTTP"), or any other suitable protocol.

Examples of communication mechanisms include, without limitation, e-mail services (such as YAHOO! and GMAIL), instant-messaging services, text-messaging services, social- and professional-networking websites (such as LINKEDIN, FACEBOOK, and MYSPACE), contact-management services (such as PLAXO), newsgroups, message boards, peer-to-peer communities, or any other virtual community.

In some embodiments, computing subsystem 210 may be a child's computing device, and computing subsystem 220 may be a parent's computing device. The parent may use computing subsystem 220 to establish and maintain communication-control policies. Thus, in some embodiments, network 520 may include a local area network, such as an enterprise network or a home network. In other embodiments, a parent and a child may share a computing device, and each of the components of computing subsystems 210 and 220 may be in a single computing device. In some embodiments, network 510 may include the Internet, and a child may attempt to communicate with a contact that is using computing subsystem 230.

In embodiments where a child uses multiple communication mechanisms to communicate with a contact, monitoring module 104 may identify and correlate aliases of the contact with a real-world identity. Monitoring module 104 may implement any method or process described in U.S. patent application Ser. No. 11/960,402, filed on 19 Dec. 2007, and titled "Systems and Methods for Correlating Online Aliases with Real-World Identities," the disclosure of which is incorporated, in its entirety, by this reference.

In some embodiments, to correlate aliases of a contact, monitoring module 104 may access a first user account associated with a first communication mechanism. User accounts for a communication mechanism may be accessed in a variety of ways. For example, in certain embodiments monitoring module 104 may access a user account associated with a communication mechanism by locating and retrieving, using a login module, login information for the user account from a login-information database. Monitoring module 104 may then use that login information to log into the user account. In an alternative embodiment, monitoring module 104 may access a user account associated with a communication mechanism by receiving login information for the user account from a user and then using that login information to log into the user account. User accounts may also be accessed using mechanism-specific access modules.

Monitoring module 104 may obtain contact data associated with a first alias from the first user account. Any type or form of contact information or data associated with an alias may be obtained from the first user account including, for example, both computer-readable and human-readable data. Examples of contact data associated with an alias include, without limitation, a name of a contact, an alias for a contact, an email address for a contact, a phone number for a contact, a fax number for a contact, a mailing address for a contact, a website address for a contact, an instant-messaging address for a contact, or any other potentially useful information.

Information or data may be obtained from user accounts in a variety of ways. In one embodiment, computer-readable data may be received from a communication mechanism in response to a request transmitted by monitoring module 104. For example, monitoring module 104 may cause a computing device to export computer-readable data, such as contact data, from a first user account associated with communication mechanism 540.

Data may also be obtained from communication mechanisms by "screen scraping" or extracting data from a display output of the communication mechanism. For example, monitoring module 104 may cause a computing device to identify data displayed in human-readable form, screen scrape or extract this human-readable data, convert this human-readable data into computer-readable data, and then store this computer-readable data in an alias-contact database.

Monitoring module 104 may identify contact data associated with a second alias. This contact data may be identified in a variety of ways. For example, in certain embodiments, and as will be described in greater detail below in connection with FIG. 7, identifying contact data associated with the second alias may comprise identifying login information for a second user account associated with a second communication mechanism, accessing the second user account using the login information, and then obtaining the contact data associated with the second alias from the second user account. In an alternative embodiment, identifying contact data associated with the second alias may comprise retrieving contact data associated with the second alias from a contact-management database (e.g., contacts stored in MICROSOFT OUTLOOK).

Monitoring module 104 may identify, by comparing the contact data associated with the first alias with the contact data associated with the second alias, at least one common characteristic between the first alias and the second alias. Common characteristics between aliases may be identified in a variety of ways. In at least one embodiment, identifying at least one common characteristic between aliases may comprise identifying at least one common name, alias, email address, phone number, fax number, mailing address, website address, instant-messaging address, or other potentially relevant characteristic.

For example, monitoring module 104 may cause a computing device to compare contact data associated with the first alias with contact data associated with the second alias to determine whether any portion of the contact data associated with the aliases is the same. For example, the computing device may determine whether an email address associated with the first alias matches an email address associated with the second alias.

If the computing device identifies at least one common characteristic between the first alias and the second alias, then monitoring module 104 may associate both the first alias and the second alias with a common contact or identity. Aliases may be associated with a common contact or identity in a variety of ways. For example, associating aliases with a common contact or identity may comprise creating or modifying a contact record for a contact that contains data identifying at least the first alias, the second alias, and contact information or data for the contact.

The phrase "contact record" may generally refer to a data record containing contact information for a friend, family member, or acquaintance of a child. Examples of the type of contact information that may be contained in a contact record include, without limitation, the name of a contact, an email address for a contact, a phone number for a contact, a fax number for a contact, a mailing address for a contact, a website address for a contact, or any other potentially useful information. In at least one embodiment, contact records may also contain information identifying the various aliases of a contact. In certain embodiments, contact records may be stored in a contact-management database. Associating aliases with a common contact or identity may also comprise displaying, using a graphical user interface, the various aliases of a contact.

For the sake of clarity, and by way of example, the following detailed description will provide an illustration of correlating aliases. In this example, communication mechanism 540 may represent a professional-networking website, such as LINKEDIN, and communication mechanism 550 may represent a social-networking website, such as MYSPACE.

A login module may cause a computing device to retrieve login information for a first user account associated with communication mechanism 540 (which, in this case, is a professional-networking website) from a login-information database. An access module may then cause the computing device to log into the first user account associated with communication mechanism 540 using the login information retrieved from the login-information database.

The computing device may identify and obtain contact data for at least one alias from the first user account. As illustrated in FIG. 6, contact data 600 may identify the name of a contact ("John R. Smith"), a work phone number for the contact ("1-811-413-4679"), a cell phone number for the contact ("1-912-376-9861"), a work address for the contact ("56789 Park Ave, NY"), an email address for the contact ("jsmith@gmail.com"), and a username or alias for the contact ("John R. Smith") used in connection with communication mechanism 540 (which, in this case, is a professional-networking website).

The computing device may identify contact data associated with a second alias by: retrieving login information for a second user account associated with communication mechanism 550 (which, in this case, may be a social-networking website) from the login-information database, logging into the second user account using the login information retrieved from the login-information database, and obtaining contact data from the second user account.

Contact data 610, in this example the contact data obtained from the second user account, may identify a home phone number for a contact ("1-123-456-1291"), a cell phone number for the contact ("1-912-376-9861"), a home address for the contact ("1234 Anywhere St, NV"), an IM address for the contact ("johnny boy"), a website for the contact ("www.smitty.com"), and a username or alias for the contact ("smitty") used in connection with communication mechanism 550 (which, in this case, is a social-networking website, such as MYSPACE).

Monitoring module 104 may cause the computing device to identify, by comparing contact data 600 associated with the first alias with contact data 610 associated with the second alias, at least one common characteristic between the first alias and the second alias. In this example, the computing device may determine that a cell phone number associated with both the first alias and the second alias is identical.

Upon identifying at least one common characteristic, the computing device may associate both the first alias and the second alias with a common contact or identity, which, in this case, may be the contact John R. Smith. In this example, the computing device may associate both the first alias and the second alias with the contact John R. Smith by creating contact record 620 for Mr. Smith that contains information that identifies each of the known aliases used by Mr. Smith. For example, contact record 620 may identify the following known aliases for Mr. Smith: "johnny boy" for AIM, "jsmith" for GMAIL, "smitty" for MYSPACE, and "John R. Smith" for LINKEDIN.

In certain embodiments, contact record 620 may also contain contact information for Mr. Smith. In at least one embodiment, the contact information contained in contact record 620 for Mr. Smith may be obtained from contact data 600 and 610, which, as detailed above, may be obtained from user accounts associated with communication mechanisms 540 and 550.

As detailed above, communication mechanisms may be accessed using mechanism-specific access modules or plug-ins that may be tailored to access specific communication mechanisms or services. FIG. 7 is a flow diagram of an exemplary computer-implemented method 700 for correlating aliases with real-world identities in which communication mechanisms may be accessed using mechanism-specific access modules. As illustrated in this figure, at step 702 a computing device may receive login information for a first user account associated with a first communication mechanism from a user. Alternatively, at step 704 a computing device may retrieve login information for a first user account associated with the first communication mechanism from a login-information database.

At step 706, the computing device may access the first user account using a mechanism-specific access module. The phrase "mechanism-specific access module" may generally refer to modules or plug-ins that are specifically tailored to perform various mechanism-specific functions. For example, a mechanism-specific access module may be configured to access (e.g., login) or retrieve information from (e.g., screen scrape) specific communication mechanisms.

In certain embodiments, the various functionalities performed by mechanism-specific access modules may be mapped to a simple interface operated by an access module, whose functionalities may be called as needed by the access module to normalize the actions performed by the access module. For example, the access module may, when accessing a certain communication mechanism, such as a web-based email service, call a mechanism-specific access module specially configured to log into this specific web-based email service. Examples of mechanism-specific access modules may include, without limitation, plug-ins, specialized application programs, or the like.

At step 708, the computing device may, using the login information for the first user account, log into the first user account. At step 710, the computing device may obtain contact data associated with a first alias from the first user account. At step 712, the computing device may determine whether a contact-management database contains contact data associated with a second alias. For example, the computing device may search a contact-management database to determine whether it contains contact data for the second alias that was previously obtained from a user account associated with a communication mechanism. If the contact-management database contains contact data for the second alias, then control proceeds to step 718 where the computing device retrieves the contact data for the second alias from the contact-management database. Otherwise control proceeds to step 714, where the computing device accesses a second user account containing data associated with the second alias using the login information for the second user account. At step 716, the computing device then obtains contact data associated with the second alias from the second user account.

At step 720, the computing device identifies, by comparing the contact data associated with the first alias with the contact data associated with the second alias, at least one common characteristic between the first alias and the second alias. At step 722, the computing device associates both the first alias and the second alias with a common contact identity.

As detailed above, aliases may be associated with contacts in a variety of ways. FIG. 8 is a flow diagram of an exemplary computer-implemented method 800 for associating aliases with contacts according to at least one embodiment. As illustrated in this figure, at step 802, upon identifying at least one common characteristic between a first alias and a second alias, a computing device may determine whether a contact record for a common contact to be associated with the first and second aliases exists within a contact-management database. If a contact record for the common contact does not exist within the contact-management database, then at step 804 the computing device may create a contact record for the common contact that associates the first and second aliases with the common contact. At step 806, the computing device may store the contact record in a contact-management database.

Alternatively, if an existing contact record for the common contact to be associated with the aliases is located within the contact-management database, then control proceeds to step 808, where the computing device may retrieve the contact record for the common contact from a contact-management database. At step 810, the computing device may modify, based on the contact data associated with the first alias and the contact data associated with the second alias, the contact record for the common contact.

This contact record may be modified in a variety of ways. For example, the computing device may modify the contact record by adding one or more additional aliases for the common contact to the contact record. The computing device may also modify other contact information stored in the contact record, such as the name of the common contact, an email address stored in the contact record, a phone number stored in the contact record, a fax number stored in the contact record, a mailing address stored in the contact record, a website address stored in the contact record, an instant-messaging address stored in the contact record, or any other contact data stored in the contact record. At step 812, the computing device may store the modified contact record in the contact-management database.

Figure 9:
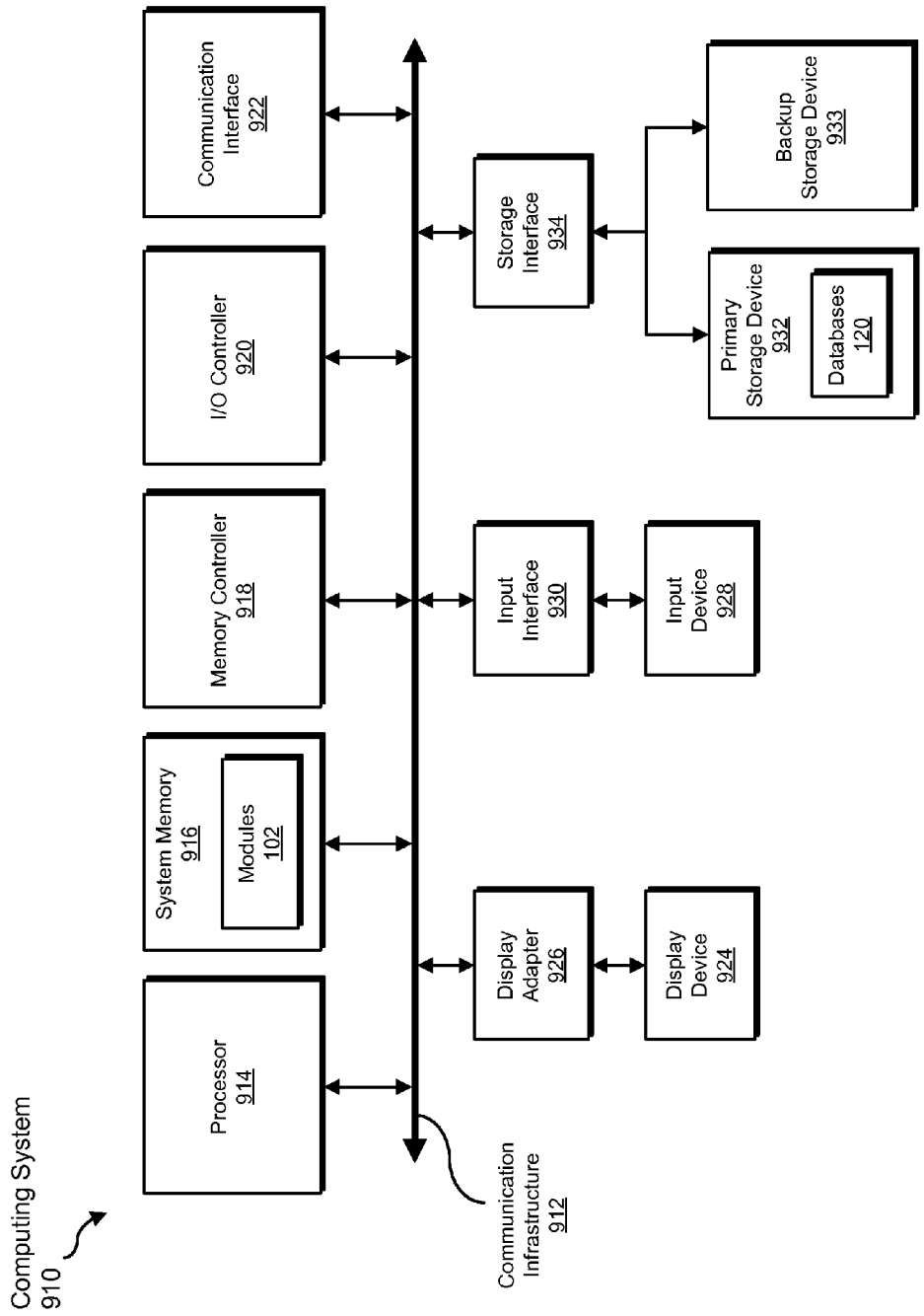
FIG. 9 is a block diagram of an exemplary computing system capable of implementing one or more of the embodiments described and/or illustrated herein.

FIG. 9 is a block diagram of an exemplary computing system 910 capable of implementing one or more of the embodiments described and/or illustrated herein. Computing system 910 broadly represents any single or multi-processor computing device or system capable of executing computer-readable instructions. Examples of computing system 910 include, without limitation, workstations, laptops, client-side terminals, servers, distributed computing systems, handheld devices, or any other computing system or device. In its most basic configuration, computing system 910 may include at least one processor 914 and a system memory 916.

Processor 914 generally represents any type or form of processing unit capable of processing data or interpreting and executing instructions. In certain embodiments, processor 914 may receive instructions from a software application or module. These instructions may cause processor 914 to perform the functions of one or more of the exemplary embodiments described and/or illustrated herein. For example, processor 914 may perform and/or be a means for performing, either alone or in combination with other elements, one or more of the identifying, categorizing, rating, providing, and updating steps described herein. Processor 914 may also perform and/or be a means for performing any other steps, methods, or processes described and/or illustrated herein.

System memory 916 generally represents any type or form of volatile or non-volatile storage device or medium capable of storing data and/or other computer-readable instructions. Examples of system memory 916 include, without limitation, random access memory (RAM), read only memory (ROM), flash memory, or any other suitable memory device. Although not required, in certain embodiments computing system 910 may include both a volatile memory unit (such as, for example, system memory 916) and a non-volatile storage device (such as, for example, primary storage device 932, as described in detail below). In one example, one or more of modules 102 from FIG. 1 may be loaded into system memory 916.

In certain embodiments, exemplary computing system 910 may also include one or more components or elements in addition to processor 914 and system memory 916. For example, as illustrated in FIG. 9, computing system 910 may include a memory controller 918, an Input/Output (I/O) controller 920, and a communication interface 922, each of which may be interconnected via a communication infrastructure 912. Communication infrastructure 912 generally represents any type or form of infrastructure capable of facilitating communication between one or more components of a computing device. Examples of communication infrastructure 912 include, without limitation, a communication bus (such as an ISA, PCI, PCIe, or similar bus) and a network.

Memory controller 918 generally represents any type or form of device capable of handling memory or data or controlling communication between one or more components of computing system 910. For example, in certain embodiments memory controller 918 may control communication between processor 914, system memory 916, and I/O controller 920 via communication infrastructure 912. In certain embodiments, memory controller may perform and/or be a means for performing, either alone or in combination with other elements, one or more of the steps or features described and/or illustrated herein, such as identifying, categorizing, rating, providing, and updating.

I/O controller 920 generally represents any type or form of module capable of coordinating and/or controlling the input and output functions of a computing device. For example, in certain embodiments I/O controller 920 may control or facilitate transfer of data between one or more elements of computing system 910, such as processor 914, system memory 916, communication interface 922, display adapter 926, input interface 930, and storage interface 934. I/O controller 920 may be used, for example, to perform and/or be a means for performing, either alone or in combination with other elements, one or more of the identifying, categorizing, rating, providing, and updating steps described herein. I/O controller 920 may also be used to perform and/or be a means for performing other steps and features set forth in the instant disclosure.

Communication interface 922 broadly represents any type or form of communication device or adapter capable of facilitating communication between exemplary computing system 910 and one or more additional devices. For example, in certain embodiments communication interface 922 may facilitate communication between computing system 910 and a private or public network including additional computing systems. Examples of communication interface 922 include, without limitation, a wired network interface (such as a network interface card), a wireless network interface (such as a wireless network interface card), a modem, and any other suitable interface. In at least one embodiment, communication interface 922 may provide a direct connection to a remote server via a direct link to a network, such as the Internet. Communication interface 922 may also indirectly provide such a connection through, for example, a local area network (such as an Ethernet network), a personal area network, a telephone or cable network, a cellular telephone connection, a satellite data connection, or any other suitable connection.

In certain embodiments, communication interface 922 may also represent a host adapter configured to facilitate communication between computing system 910 and one or more additional network or storage devices via an external bus or communications channel. Examples of host adapters include, without limitation, SCSI host adapters, USB host adapters, IEEE 994 host adapters, SATA and eSATA host adapters, ATA and PATA host adapters, Fibre Channel interface adapters, Ethernet adapters, or the like. Communication interface 922 may also allow computing system 910 to engage in distributed or remote computing. For example, communication interface 922 may receive instructions from a remote device or send instructions to a remote device for execution. In certain embodiments, communication interface 922 may perform and/or be a means for performing, either alone or in combination with other elements, one or more of the identifying, categorizing, rating, providing, and updating steps disclosed herein. Communication interface 922 may also be used to perform and/or be a means for performing other steps and features set forth in the instant disclosure.

As illustrated in FIG. 9, computing system 910 may also include at least one display device 924 coupled to communication infrastructure 912 via a display adapter 926. Display device 924 generally represents any type or form of device capable of visually displaying information forwarded by display adapter 926. Similarly, display adapter 926 generally represents any type or form of device configured to forward graphics, text, and other data from communication infrastructure 912 (or from a frame buffer, as known in the art) for display on display device 924.

As illustrated in FIG. 9, exemplary computing system 910 may also include at least one input device 928 coupled to communication infrastructure 912 via an input interface 930. Input device 928 generally represents any type or form of input device capable of providing input, either computer or human generated, to exemplary computing system 910. Examples of input device 928 include, without limitation, a keyboard, a pointing device, a speech recognition device, or any other input device. In at least one embodiment, input device 928 may perform and/or be a means for performing, either alone or in combination with other elements, one or more of the identifying, categorizing, rating, providing, and updating steps disclosed herein. Input device 928 may also be used to perform and/or be a means for performing other steps and features set forth in the instant disclosure.

As illustrated in FIG. 9, exemplary computing system 910 may also include a primary storage device 932 and a backup storage device 933 coupled to communication infrastructure 912 via a storage interface 934. Storage devices 932 and 933 generally represent any type or form of storage device or medium capable of storing data and/or other computer-readable instructions. For example, storage devices 932 and 933 may be a magnetic disk drive (e.g., a so-called hard drive), a floppy disk drive, a magnetic tape drive, an optical disk drive, a flash drive, or the like. Storage interface 934 generally represents any type or form of interface or device for transferring data between storage devices 932 and 933 and other components of computing system 910. In one example, databases 120 from FIG. 1 may be stored in primary storage device 932.

In certain embodiments, storage devices 932 and 933 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 932 and 933 may also include other similar structures or devices for allowing computer software, data, or other computer-readable instructions to be loaded into computing system 910. For example, storage devices 932 and 933 may be configured to read and write software, data, or other computer-readable information. Storage devices 932 and 933 may also be a part of computing system 910 or may be a separate device accessed through other interface systems.

In certain embodiments, storage devices 932 and 933 may be used, for example, to perform and/or be a means for performing, either alone or in combination with other elements, one or more of the identifying, categorizing, rating, providing, and updating steps disclosed herein. Storage devices 932 and 933 may also be used to perform and/or be a means for performing other steps and features set forth in the instant disclosure.

Many other devices or subsystems may be connected to computing system 910. Conversely, all of the components and devices illustrated in FIG. 9 need not be present to practice the embodiments described and/or illustrated herein. The devices and subsystems referenced above may also be interconnected in different ways from that shown in FIG. 9. Computing system 910 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 910. All or a portion of the computer program stored on the computer-readable medium may then be stored in system memory 916 and/or various portions of storage devices 932 and 933. When executed by processor 914, a computer program loaded into computing system 910 may cause processor 914 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 910 may be configured as an application specific integrated circuit (ASIC) adapted to implement one or more of the exemplary embodiments disclosed herein.

Figure 10:
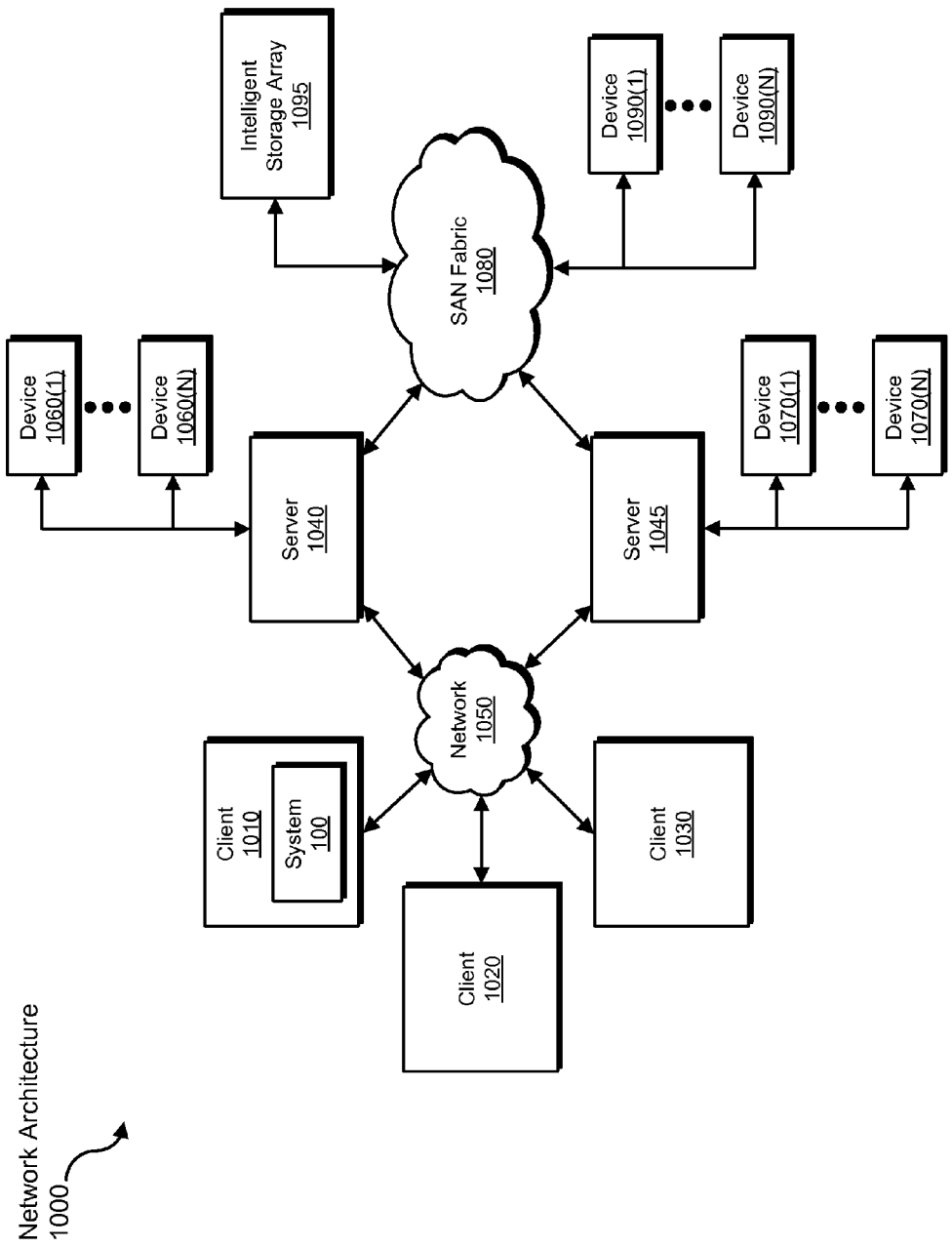
FIG. 10 is a block diagram of an exemplary computing network capable of implementing one or more of the embodiments described and/or illustrated herein.

FIG. 10 is a block diagram of an exemplary network architecture 1000 in which client systems 1010, 1020, and 1030 and servers 1040 and 1045 may be coupled to a network 1050. Client systems 1010, 1020, and 1030 generally represent any type or form of computing device or system, such as exemplary computing system 910 in FIG. 9. In one example, client system 1010 may include system 100 from FIG. 1.

Similarly, servers 1040 and 1045 generally represent computing devices or systems, such as application servers or database servers, configured to provide various database services and/or run certain software applications. Network 1050 generally represents any telecommunication or computer network including, for example, an intranet, a wide area network (WAN), a local area network (LAN), a personal area network (PAN), or the Internet.

As illustrated in FIG. 10, one or more storage devices 1060(1)-(N) may be directly attached to server 1040. Similarly, one or more storage devices 1070(1)-(N) may be directly attached to server 1045. Storage devices 1060(1)-(N) and storage devices 1070(1)-(N) generally represent any type or form of storage device or medium capable of storing data and/or other computer-readable instructions. In certain embodiments, storage devices 1060(1)-(N) and storage devices 1070(1)-(N) may represent network-attached storage (NAS) devices configured to communicate with servers 1040 and 1045 using various protocols, such as NFS, SMB, or CIFS.

Servers 1040 and 1045 may also be connected to a storage area network (SAN) fabric 1080. SAN fabric 1080 generally represents any type or form of computer network or architecture capable of facilitating communication between a plurality of storage devices. SAN fabric 1080 may facilitate communication between servers 1040 and 1045 and a plurality of storage devices 1090(1)-(N) and/or an intelligent storage array 1095. SAN fabric 1080 may also facilitate, via network 1050 and servers 1040 and 1045, communication between client systems 1010, 1020, and 1030 and storage devices 1090(1)-(N) and/or intelligent storage array 1095 in such a manner that devices 1090(1)-(N) and array 1095 appear as locally attached devices to client systems 1010, 1020, and 1030. As with storage devices 1060(1)-(N) and storage devices 1070(1)-(N), storage devices 1090(1)-(N) and intelligent storage array 1095 generally represent any type or form of storage device or medium capable of storing data and/or other computer-readable instructions.

In certain embodiments, and with reference to exemplary computing system 910 of FIG. 9, a communication interface, such as communication interface 922 in FIG. 9, may be used to provide connectivity between each client system 1010, 1020, and 1030 and network 1050. Client systems 1010, 1020, and 1030 may be able to access information on server 1040 or 1045 using, for example, a web browser or other client software. Such software may allow client systems 1010, 1020, and 1030 to access data hosted by server 1040, server 1045, storage devices 1060(1)-(N), storage devices 1070(1)-(N), storage devices 1090(1)-(N), or intelligent storage array 1095. Although FIG. 10 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1040, server 1045, storage devices 1060(1)-(N), storage devices 1070(1)-(N), storage devices 1090(1)-(N), intelligent storage array 1095, or any combination thereof. All or a portion of one or more of the exemplary embodiments disclosed herein may also be encoded as a computer program, stored in server 1040, run by server 1045, and distributed to client systems 1010, 1020, and 1030 over network 1050. Accordingly, network architecture 1000 may perform and/or be a means for performing, either alone or in combination with other elements, one or more of the identifying, categorizing, rating, providing, and updating steps disclosed herein. Network architecture 1000 may also be used to perform and/or be a means for performing other steps and features set forth in the instant disclosure.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

In certain embodiments, one or more of the software modules disclosed herein may be implemented in a cloud computing environment. Cloud computing environments may provide various services and applications via the internet. These cloud-based services (e.g., software as a service, platform as a service, infrastructure as a service, etc.) may be accessible through a web browser or other remote interface. Various functions described herein may be provided through a remote desktop environment or any other cloud-based computing environment. For example, online relationships may be rated in a cloud computing environment and/or one or more of modules 102 may operate in a cloud computing environment.

One or more of the software modules described herein may transform data, physical devices, and/or representations of physical devices from one form to another. For example, rating module 108 may transform categorizations of communications into a rating of an online relationship.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for rating online relationships, at least a portion of the method being performed by a computing device comprising at least one processor, the method comprising:
   identifying a first communication between a child and a contact;
   categorizing content of the first communication to create a first categorization;
   identifying a second communication between the child and the contact;
   categorizing content of the second communication to create a second categorization;
   rating, based at least in part on the first and second categorizations, an online relationship of the child and the contact;
   providing the rating of the online relationship to a guardian of the child.

2. The computer-implemented method of claim 1, wherein:
   categorizing content of the first communication comprises assigning a first weight to the first categorization, wherein the first weight indicates a probability of the first categorization being an accurate categorization of the first communication;
   categorizing content of the second communication comprises assigning a second weight to the second categorization, wherein the second weight indicates a probability of the second categorization being an accurate categorization of the second communication;
   the rating of the online relationship is created based at least in part on the first and second weights.

3. The computer-implemented method of claim 1, wherein:
   the first communication is made via a first communication mechanism;
   identifying the first communication between the child and the contact comprises:
      identifying a first alias associated with the first communication mechanism;
      determining that the first alias is an alias of the contact;
   the second communication is made via a second communication mechanism;
   identifying the second communication between the child and the contact comprises:
      identifying a second alias associated with the second communication mechanism;
      determining that the second alias is an alias of the contact.

4. The computer-implemented method of claim 1, further comprising:
   categorizing content of subsequent communications between the child and the contact;
   updating, based at least in part on categorizations of the content of the subsequent communications, the rating of the online relationship.

5. The computer-implemented method of claim 1, wherein:
   the first categorization identifies a sender of the first communication;
   the second categorization identifies a sender of the second communication.

6. The computer-implemented method of claim 1, wherein the rating of the online relationship indicates a pattern of inappropriate content being exchanged between the child and the contact.

7. The computer-implemented method of claim 1, wherein:
   categorizing the content of the first communication comprises:
      identifying a uniform resource locator in the content of the first communication;
      categorizing content referenced by the uniform resource locator.

8. The computer-implemented method of claim 1, wherein:
   the first communication comprises a file;
   categorizing the content of the first communication comprises categorizing content of the file.

9. The computer-implemented method of claim 1, wherein rating the online relationship of the child and the contact comprises rating online relationships between the child and a plurality of contacts.

10. The computer-implemented method of claim 1, wherein:
    providing the rating of the online relationship comprises providing a plurality of ratings of the online relationship;
    each rating in the plurality of ratings is associated with a different type of content.

11. A system for rating an online relationship of a child and a contact, the system comprising:
    at least one processor;
    a monitoring module programmed to direct the processor to:
       identify a first communication between the child and the contact;
       identify a second communication between the child and the contact;
    a categorization module programmed to direct the processor to:
       categorize content of the first communication to create a first categorization;
       categorize content of the second communication to create a second categorization;
    a rating module programmed to direct the processor to rate, based at least in part on the first and second categorizations, the online relationship of the child and the contact;
    an interface module programmed to direct the processor to provide the rating of the online relationship to a guardian of the contact.

12. The system of claim 11, wherein:
    the categorization module is further programmed to direct the processor to:
       assign a first weight to the first categorization, wherein the first weight indicates a probability of the first categorization being an accurate categorization of the first communication;
       assign a second weight to the second categorization, wherein the second weight indicates a probability of the second categorization being an accurate categorization of the second communication;
    the rating of the online relationship is based at least in part on the first and second weights.

13. The system of claim 11, wherein:
    the first communication is made via a first communication mechanism;
    the second communication is made via a second communication mechanism;
    the monitoring module is programmed to direct the processor to:
       identify a first alias associated with the first communication mechanism;
       determine that the first alias is an alias of the contact;

identify a second alias associated with the second communication mechanism;
determine that the second alias is an alias of the contact.

14. The system of claim 11, wherein:
the categorization module is programmed to direct the processor to categorize content of subsequent communications between the child and the contact;
the rating module is programmed to direct the processor to update, based at least in part on categorizations of the content of the subsequent communications, the rating of the online relationship.

15. The system of claim 11, wherein the rating of the online relationship indicates a pattern of inappropriate content being exchanged between the child and the contact.

16. The system of claim 11, wherein:
the categorization module is programmed to direct the processor to:
identify a uniform resource locator in the content of the first communication;
categorize content referenced by the uniform resource locator.

17. The system of claim 11, wherein:
the first communication comprises a file;
the categorization module is programmed to categorize content of the file.

18. A computer-readable-storage medium comprising one or more computer-executable instructions that, when executed by a computing device, cause the computing device to:
identify a first communication between a child and a contact of the child;
categorize content of the first communication to create a first categorization;
identify a second communication between the child and the contact;
categorize content of the second communication to create a second categorization;
rate, based at least in part on the first and second categorizations, an online relationship of the child and the contact;
provide the rating of the online relationship to a guardian of the contact.

19. The computer-readable-storage medium of claim 18, wherein:
the one or more computer-executable instructions are programmed to cause the computing device to:
assign a first weight to the first categorization, wherein the first weight indicates a probability of the first categorization being an accurate categorization of the first communication;
assign a second weight to the second categorization, wherein the second weight indicates a probability of the second categorization being an accurate categorization of the second communication;
the rating of the online relationship is created based at least in part on the first and second weights.

20. The computer-readable-storage medium of claim 18, wherein:
the first communication is made via a first communication mechanism;
the second communication is made via a second communication mechanism;
the one or more computer-executable instructions are programmed to cause the computing device to:
identify a first alias associated with the first communication;
determine that the first alias is an alias of the contact;
identify a second alias associated with the second communication mechanism;
determine that the second alias is an alias of the contact.

\* \* \* \* \*